United States Patent [19]
Lysson et al.

[11] Patent Number: 5,711,781
[45] Date of Patent: Jan. 27, 1998

[54] APPARATUS AND METHOD FOR HEATING AN ELONGATED GLASS

[75] Inventors: Hans-Jurgen Lysson, Korschenbroich; Frank Lisse, Cologne, both of Germany

[73] Assignee: Kabel Rheydt Aktiengesellschaft, Monchen-Gladbach, Germany

[21] Appl. No.: 697,017

[22] Filed: Aug. 16, 1996

Related U.S. Application Data

[63] Continuation of Ser. No. 236,375, May 2, 1994, abandoned.

[30] Foreign Application Priority Data

May 4, 1993 [DE] Germany ............... 43 14 638.4

[51] Int. Cl.$^6$ ............... C03B 23/045; C03B 29/00
[52] U.S. Cl. ............... 65/385; 65/104; 65/109; 65/120; 65/252; 65/271; 65/284; 65/292; 65/374.13; 65/507; 65/DIG. 8; 82/150
[58] Field of Search ............... 65/61, 65, 104, 65/109, 102, 120, 227, 244, 252, 268, 271, 284, 292, 385, 412, 405, 477, 483, 507, 509, DIG. 8, 374.1, 374.13, 427, 428, 508; 82/150, 165; 142/53; 431/278, 279

[56] References Cited

U.S. PATENT DOCUMENTS

| 172,624 | 1/1876 | Hall ............... 82/150 |
| 2,370,918 | 3/1945 | Rohl ............... 142/53 |
| 2,731,772 | 1/1956 | Ehret, Jr. et al. . |
| 3,263,852 | 8/1966 | Fridrich ............... 65/109 |
| 3,485,613 | 12/1969 | Herczog et al. ............... 65/120 |
| 3,537,833 | 11/1970 | Gossie et al. ............... 65/109 |
| 4,578,101 | 3/1986 | Clark et al. ............... 65/109 |
| 4,702,132 | 10/1987 | Grosse ............... 82/165 |
| 5,158,589 | 10/1992 | Curtis et al. ............... 65/109 |
| 5,192,350 | 3/1993 | Le Sergent ............... 65/109 |
| 5,203,691 | 4/1993 | OBrien, Jr. ............... 65/271 |
| 5,211,730 | 5/1993 | Kanamori et al. ............... 65/120 |

FOREIGN PATENT DOCUMENTS

| 216338 | 4/1987 | European Pat. Off. . |
| 519479 | 12/1992 | European Pat. Off. . |
| 0525681 | 2/1993 | European Pat. Off. . |
| 612700 | 8/1994 | European Pat. Off. ............... 65/65 |
| 2732615 | 7/1977 | Germany . |
| 3321711 | 12/1984 | Germany . |
| 2-275723 | 11/1990 | Japan ............... 65/275 |
| 564140 | 9/1944 | United Kingdom . |
| 2176472 | 12/1986 | United Kingdom . |

*Primary Examiner*—Steven P. Griffin
*Attorney, Agent, or Firm*—Ware, Fressola, Van Der Sluys & Adolphson LLP

[57] ABSTRACT

An apparatus for heating an elongated glass body, which, for example, may be used as a pre-form for the drawing of glass fibers, includes a rotatable first chuck wherein the first end of the elongated glass body may be rotatably secured. In addition the apparatus includes a second rotatable chuck whereat the second end of the elongated glass body is introduced into a quartz tube and this quartz tube is clamped into the rotatable second chuck. A burner, which is adapted to slide parallel to the longitudinal axis of the elongated glass tube, heats the elongated glass body in such a manner, that a so called fire polish of the elongated glass body for the improvement of its surface quality occurs. A method for heating the elongated glass body is also disclosed. The method includes the steps of clamping the first end of the elongated glass body in a first rotatable chuck, introducing the second end of the elongated glass body into the quartz tube which is secured in the second rotatable chuck, rotating the elongated glass body around the longitudinal access thereof, and heating the elongated glass body with a burner which slides at least parallel to the axis of the elongated glass body.

15 Claims, 1 Drawing Sheet

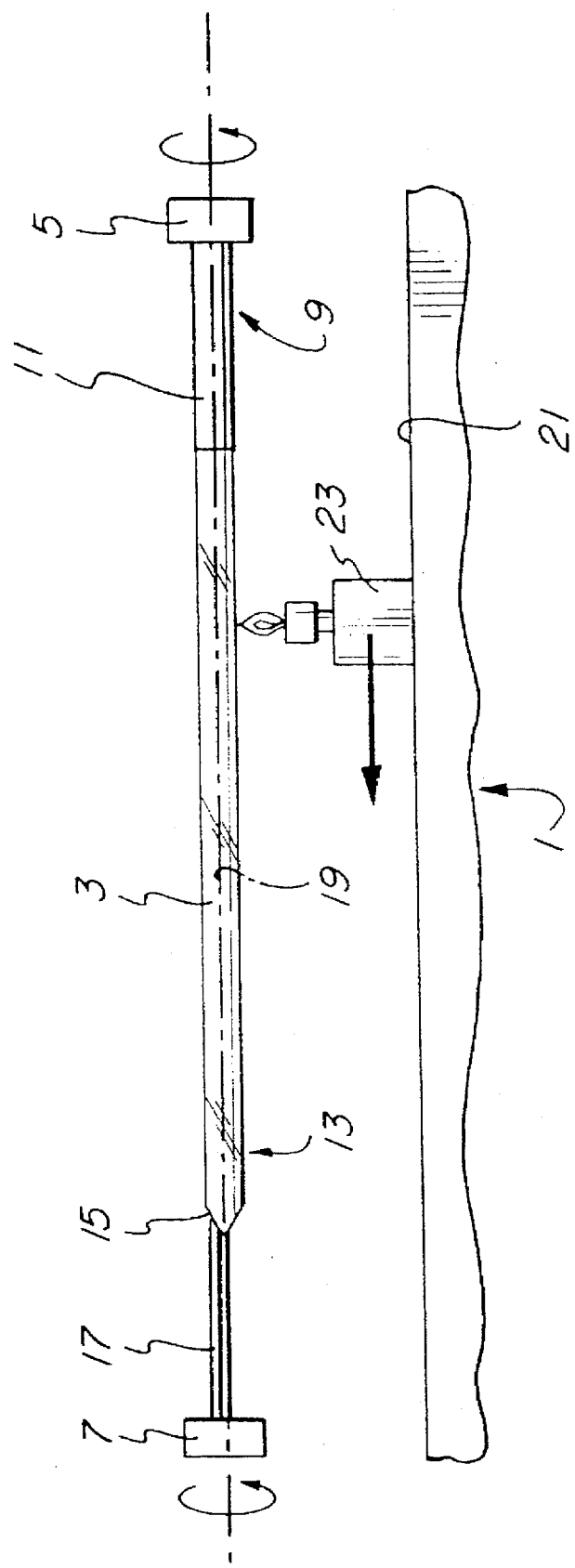

APPARATUS AND METHOD FOR HEATING AN ELONGATED GLASS

This application is a continuation of application Ser. No. 08,236,375 filed on May 2, 1994, now abandoned.

BACKGROUND OF THE INVENTION

The present invention generally relates to an apparatus and method for heating an elongated glass body and, in particular, relates to one such apparatus and method wherein one end of the glass body is introduced into a quartz tube that is clamped into a chuck.

In general, in order to heat an elongated glass body, the ends thereof are clamped into rotatable chucks. Once, secured in the clamps a sliding burner is used to heat the elongated glass body. The elongated glass body is rotated around its longitudinal axis and heated by means of the burner that is adapted to slide at least along an axis parallel to the longitudinal axis of the glass body.

Such an apparatus and method, respectively, for heating an elongated glass body is known from the German Patent Application DE 27 32 615 A1. In this application the elongated tubular glass body is clamped at both ends into rotatable chucks and heated by means of a heat source. The heat source being adapted to move along the longitudinal dimension of the tube.

In order to draw high quality, mechanically rigid optical glass fibers having reproducible optical characteristics and serving for the transmission of information, so called preforms are used. It is important that the preforms have a highly homogeneous and contamination-free surface. For this purpose it is known to fire polish the preform immediately before drawing the optical fiber.

To carry out such a fire polishing by use of the apparatus described and discussed in the German Patent Application DE 27 32 615 A1, a quartz rod is welded to the glass body. This quartz rod is then clamped into the chuck to carry out the fire polishing of the preform. The fire polishing is carried out along the whole length of the glass body to ensure a high quality glass fiber subsequently drawn from the preform. After finishing the fire polish, the quartz rod has to be melted apart again.

In order to prevent contamination of the homogenous surface that was achieved by the fire polishing of the glass body when melting off the quartz rod, the elongated glass body has to be supported by so called directing rollers. The directing rollers ensure an approximately constant distance between the glass body and the burner and might result in a contamination of the surface of the glass body. Such contamination can result in a poor quality optical fiber being drawn from the preform. Because such preforms are quite expensive to produce, the problem of contamination is important to avoid or overcome.

Further, by the very nature of the conventional apparatus and methods, the preforms can be easily mechanically damaged, particularly during the removal of the quartz tube subsequent to the fire polishing.

Consequently, an apparatus and method for heating an elongated glass body that avoids contamination and mechanical damage to the surface of the elongated glass body is highly desirable and needed.

SUMMARY OF THE INVENTION

Accordingly, it is one object of the present invention to provide an apparatus and method for heating an elongated glass body such that the above discussed drawbacks are overcome.

This object is accomplished, at least in part, by an apparatus and method wherein one end of the glass body is introduced into a quartz tube that is clamped into a chuck.

The advantages achieved from use of the present apparatus and method are, in one particular aspect, that contamination of the surface of the elongated glass body by contact with a foreign object during or after the fire polishing is prevented and a high surface quality is achieved. Additionally, the production of the elongated glass body is made essentially easier, since potentially contaminating adjustments of a guiding roller are avoided, there is no declamping and reclamping of the elongated glass body during the process and further there is no aligning, welding and melting off of a quartz rod used to assist in the clamping. By this means, after drawing the elongated glass body used as preform, glass fibers of a especially high quality may be produced in a simple way, whereby the solidity of the fibers is increased, the danger of fiber fracture is decreased and the optical properties of the glass fibers produced are improved.

In another particular aspect of the present invention the glass body is provided with a peak at the second end thereof that allow easy introduction of the second end of the glass body into the quartz tube. Such a feature provides a solid fit and an easy centering of the elongated glass body. Further, to ensure a contamination free surface of the elongated glass body the surface of the glass body and the quartz tube are selected to have similar thermal properties. Specifically, it is particularly advantageous if the quartz tube is made from the same material as the surface of the glass body.

Other objects and advantages will become apparent to those skilled in the art from the following detailed description of the invention read in conjunction with the appended claims and the drawing attached hereto.

BRIEF DESCRIPTION OF THE DRAWINGS

The single figure of the drawing is a schematic diagram of an apparatus for heating an elongated glass body embodying the principles of the present invention.

DETAILED DESCRIPTION OF THE INVENTION

An apparatus, generally indicated at 1 in the Figure and embodying the principles of the present invention, for heating an elongated glass body 3 includes a chuck 5 to which a first end 9 of the elongated glass body may be rotatably attached. In the preferred embodiment the elongated glass body 3 may, for example, serve as a preform for the drawing of optical fibers used for the transmission of information. The chuck 5 is adapted to rotate about the longitudinal axis 19 of the elongated glass body 3. The apparatus further includes a second chuck 7 to which a second end 13 of the elongated glass body 3 can be affixed. The second chuck 7 is also rotatable about the longitudinal axis 19 of the elongated body.

Although the elongated glass body may have, for example, a cylindrical shape, other shapes may also be used. In one embodiment, the elongated 91ass body 3 is provided, at the first end 9 thereof, with a clamping section 11. In this embodiment, the clamping section 11 is in form of a quartz rod welded onto the elongated glass body 3. Further, in this embodiment, the second end 13 of the elongated glass body 3, which is distal from the first end 9 thereof, is terminated in an approximately cone shaped peak To use the apparatus 1 the elongated glass body 3 is clamped, via the clamping section 11, into the first chuck 5 at the first end 9 thereof. The peak 15 of the second end 13 of the elongated glass body 3 is introduced into a thick-walled tube 17 such that the elongated glass body 3 slightly extends, depending upon the configuration of the peak 15, into the quartz tube 17. In the preferred embodiment, the thick-walled quartz tube for example, is formed from the same material as the outer material of the elongated glass body 3. It will be understood that in the instance where the elongated glass body 3 is a preform for the drawing of fibers, the preform may be built up in layers and hence, it is the outer material that should have thermal properties close to that of the thick walled tube 17. By such an arrangement, the contact between the elongated glass body 3 and the quartz tube 17 occurs in an area that will not be drawn to an optical fiber. Consequently, fractures of the fiber as a result of contamination of the surface of the elongated glass body 3 are prevented.

The quartz tube 17 at the end thereof that is distal to the end receiving the peak 15 of the elongated glass body 3 is clamped into the chuck 7 of the apparatus By this means, the glass body 3, for example, can be rotated by the drivable first chuck 5 around its longitudinal axis 19 while being rigidly secured. Further, such an arrangement ensures that the elongated glass body 3 is secured concentrically to the longitudinal axis 19.

The apparatus further includes, a bench 21 having a burner 23 disposed thereon. The burner 23 serves as a source of heat for fire polishing the elongated glass body 3. The burner 23 is disposed on the bench 21 such that it is movable at least parallel to the longitudinal axis 19. However, for example, the burner 23 can also move crosswise. In order to fire polish the glass body 3, the burner 23 moves from the clamping section 11 to the peak 15 of the glass body 3 while the elongated glass body 3 is rotating around the longitudinal axis 19 thereof. Hence, a constant distance between the burner 23 and the elongated glass body 3 is maintained. As a result of using the apparatus 1 an elongated glass body 3 with a contamination free and smooth surface is achieved and which is very suitable for the drawing of glass fibers with a high strength.

Preferably, to clamp the glass body 3 into the apparatus 1 the peak 15 of the elongated glass body 3 is first inserted into the quartz tube 17. Thereafter, the clamping section 11 of the elongated glass body 3, while the quartz tube 17 is attached, is clamped into the first chuck 5. Thus, the elongated glass body 3 is secured at the first end 9 thereof via the clamping section 11 into the first chuck 5 and secured at the second end 13 thereof via the quartz tube 17 into the second chuck 7.

Although the present invention has been discussed and described herein with respect to one or more specific embodiments it will be understood that other arrangements and configurations may be used that do not depart from the spirit and scope hereof. Hence, the present invention is deemed limited only by the appended claims and the reasonable interpretation thereof.

What is claimed:

1. An apparatus for heating an elongated glass body comprising:
   a rotatable first chuck for clamping a first end of said elongated glass body;
   a slidable burner;
   a rotatable second chuck; and
   a quartz tube clamped into said second chuck, said quartz tube being constructed and arranged to receive a second end of said elongated glass body such that said elongated glass body is secured between said first and said second chucks without aligning, welding and subsequent melting off of a quartz rod from said elongated glass body to assist in said securing of said elongated glass body between said first and second chucks.

2. The apparatus as claimed in claim 1, wherein said second end of said elongated glass body is shaped as a peak, and wherein when said second end of said elongated glass body is received by said quartz tube, said peak extends into said quartz tube.

3. The apparatus as claimed in claim 2, wherein said elongated glass body includes a plurality of layers including a surface layer of an outer material, and wherein said quartz tube is made from said outer material.

4. The apparatus as claimed in claim 3, wherein said elongated glass body is a preform for drawing optical fibers.

5. The apparatus as claimed in claim 1, wherein said elongated glass body includes a plurality of layers including a surface layer of an outer material, and wherein said quartz tube is made from said outer material.

6. A method for heating an elongated glass body, said method comprising the steps of:
   clamping a first end of said elongated glass body into a first rotatable chuck;
   introducing a second end of said elongated glass body into a quartz tube which is secured in a second rotatable chuck thereby securing said elongated glass body between said first and second chucks without aligning, welding and subsequent melting off of a quartz rod from said elongated glass body to assist in said securing of said elongated glass body between said first and second chucks;
   rotating said elongated glass body around the longitudinal axis thereof; and
   heating said elongated glass body by means of a burner that slides at least parallel to said longitudinal axis thereof.

7. The method as claimed in claim 6, wherein said elongated glass body includes a peak formed at said second end thereof, and wherein said step of introducing a second end of said elongated glass body into a quartz tube includes inserting said peak into said quartz tube.

8. The method as claimed in claim 6, wherein the step of clamping the first end of said elongated glass body occurs subsequent to said second end of said elongated glass body being introduced into said quartz tube which is secured in said second rotatable chuck.

9. The method as claimed in claim 6, wherein the step of heating includes fire polishing the surface of said elongated glass body with said burner.

10. The method as claimed in claim 6, wherein said elongated glass body is a preform for drawing optical fibers and wherein the step of heating includes fire polishing the surface of said preform with said burner.

11. The method as claimed in claim 10, wherein said preform includes a peak formed at a second end thereof, and wherein said step of introducing a second end of said elongated glass body into a quartz tube includes inserting said peak into said quartz tube.

12. An apparatus for fire polishing the surface of a preform comprising:
   a rotatable first chuck for clamping a first end of said preform;
   a slidable burner;
   a rotatable second chuck; and a tube made of a quartz material, said tube being clamped into said second chuck, said tube being constructed and arranged to receive a second end of said preform such that said preform is secured between said fast and said second chucks, without aligning, welding and subsequent melting off of a quartz rod from said preform to assist in said securing of said perform between said first and second chucks.

13. The apparatus as claimed in claim 12, wherein said second end of said preform is shaped as a peak, and wherein when said second end of said preform is received by said tube, said peak extends into said tube.

14. The apparatus as claimed in claim 13, wherein said preform includes a plurality of layers including a surface layer of an outer material, and wherein said tube is made from said outer material.

15. The apparatus as claimed in claim 12, wherein said preform includes a plurality of layers including a surface layer of an outer material, and wherein said tube is made from said outer material.

* * * * *

UNITED STATES PATENT AND TRADEMARK OFFICE
CERTIFICATE OF CORRECTION

PATENT NO.   : 5,711,781
DATED        : January 27, 1998
INVENTOR(S)  : Hans-Jurgen Lysson, et al It is certified that error appears in the above-indentified patent and that said Letters Patent is hereby corrected as shown below:

On the title page, item [54] and Column 1, line 1, the title should read
  --APPARATUS AND METHOD FOR HEATING AN ELONGATED GLASS BODY--.
  Column 5, in line 4, "fast" should be --first--.
  Column 5, in line 7, "perform" should be --preform--.

Signed and Sealed this

Twenty-third Day of June, 1998

Attest:

BRUCE LEHMAN

*Attesting Officer*         *Commissioner of Patents and Trademarks*

UNITED STATES PATENT AND TRADEMARK OFFICE
CERTIFICATE OF CORRECTION

PATENT NO. : 5,711,781
DATED : January 27, 1998
INVENTOR(S) : Hans-Jurgen Lysson et al.

It is certified that error appears in the above-identified patent and that said Letters Patent is hereby corrected as shown below:

column 3, in line 6, after "tube", --17,-- should be inserted.
  column 3, in line 20, after "apparatus", --1.-- should be inserted.
  column 3, in line 65, "robe" should be --tube--.
  column 4, in line 62, "perform" should be --preform--.

Signed and Sealed this

Ninth Day of March, 1999

Attest:

Attesting Officer

Q. TODD DICKINSON

Acting Commissioner of Patents and Trademarks